United States Patent
Liu et al.

(10) Patent No.: US 9,754,107 B2
(45) Date of Patent: Sep. 5, 2017

(54) METHOD AND USER DEVICE FOR PROCESSING VIRUS FILES

(71) Applicant: TENCENT TECHNOLOGY (SHENZHEN) COMPANY LIMITED, Shenzhen (CN)

(72) Inventors: Zhao Liu, Shenzhen (CN); Qiyuan Meng, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 14 days.

(21) Appl. No.: 14/678,046

(22) Filed: Apr. 3, 2015

(65) Prior Publication Data

US 2015/0213262 A1    Jul. 30, 2015

Related U.S. Application Data

(63) Continuation of application No. PCT/CN2013/085353, filed on Oct. 17, 2013.

(30) Foreign Application Priority Data

Oct. 17, 2012 (CN) .......................... 2012 1 0395070

(51) Int. Cl.
*G06F 21/00* (2013.01)
*G06F 21/56* (2013.01)

(52) U.S. Cl.
CPC ............ *G06F 21/561* (2013.01); *G06F 21/56* (2013.01); *G06F 21/566* (2013.01); *G06F 2221/034* (2013.01)

(58) Field of Classification Search
USPC ...................................... 726/22, 24
See application file for complete search history.

(56) References Cited

U.S. PATENT DOCUMENTS

| 2003/0093682 | A1* | 5/2003 | Carmona | .............. G06F 21/562 713/187 |
| 2005/0216770 | A1 | 9/2005 | Rowett et al. | |
| 2008/0155691 | A1 | 6/2008 | Fossen et al. | |

(Continued)

FOREIGN PATENT DOCUMENTS

| CN | 101226570 A | 7/2008 |
| CN | 101382984 A | 3/2009 |

(Continued)

OTHER PUBLICATIONS

International Search Report for Application No. PCT/CN2013/085353 dated Jan. 30, 2014.

(Continued)

*Primary Examiner* — Jason Lee
(74) *Attorney, Agent, or Firm* — Harness, Dickey & Pierce, P.L.C.

(57) ABSTRACT

A method and a user device for processing virus files. First information of at least one category of virus files and second information of a manner for processing each of the at least one category of virus files are provided. A category of a virus file when the virus file is identified. A manner of processing viruses of the category from the first information and the second information is obtained and the virus file is processed by using the manner without information about the virus file being presented to a user.

9 Claims, 3 Drawing Sheets (56) References Cited

U.S. PATENT DOCUMENTS

| | | | | |
|---|---|---|---|---|
| 2014/0123290 A1* | 5/2014 | Li | ......................... | G06F 21/568 |
| | | | | 726/24 |
| 2014/0150105 A1* | 5/2014 | Yu | ......................... | G06F 21/562 |
| | | | | 726/24 |
| 2015/0205979 A1* | 7/2015 | Dong | .................... | G06F 21/568 |
| | | | | 726/22 |

FOREIGN PATENT DOCUMENTS

| | | |
|---|---|---|
| CN | 101547126 A | 9/2009 |
| CN | 102194072 A | 9/2011 |

OTHER PUBLICATIONS

Chinese Office Action for Application No. 201210395070.2 dated Feb. 1, 2016, and an English concise explanation of relevance thereof.

International Preliminary Report for Application No. PCT/CN2013/085353, dated Apr. 30, 2015.

* cited by examiner

METHOD AND USER DEVICE FOR PROCESSING VIRUS FILES

CROSS-REFERENCE TO RELATED APPLICATIONS

This application is a continuation of International Application No. PCT/CN2013/085353 filed on Oct. 17, 2013. This application claims the benefit and priority of Chinese Application No. 201210395070.2 filed Oct. 17, 2012. The entire disclosures of each of the above applications are incorporated herein by reference.

FIELD

The present disclosure relates to a method and a user device for processing virus files.

BACKGROUND

This section provides background information related to the present disclosure which is not necessarily prior art.

Anti-virus software generally displays information of a virus to a user soon after the virus is detected to implement a real-time virus report mechanism. When there is a virus detected in a user device, anti-virus software may display multiple virus alerts that the user may have difficulty processing one by one. The alerts distract the user continuously and disturb the user.

Some anti-virus software may display in a dialog box the information of all viruses detected during the period that the dialog box is being displayed to avoid multiple dialog boxes popping up, which may disturb the user.

SUMMARY

This section provides a general summary of the disclosure, and is not a comprehensive disclosure of its full scope or all of its features.

Various embodiments of the present disclosure provide a method and a user device for processing virus files. The technical schemes are as follows.

A method for processing virus files may include:
providing first information on at least one category of virus files and second information on a manner for processing each of the at least one category of virus files;
obtaining a category of a virus file when the virus file is identified;
obtaining a manner for processing virus files in the category from the first information and the second information and processing the virus file by using the manner without presenting information about the virus file to a user.

A user device may include:
a category obtaining module, configured to obtain a category of a virus file when the virus file is identified without presenting information about the virus file to a user;
a manner obtaining module, configured to obtain a manner for processing virus files of the category by using pre-defined first information of at least one category of virus file and second information of a manner for processing each of the at least one category of virus files without presenting information about the virus file to a user; and
a processing module, configured to process the virus file according to the manner without presenting the information about the virus file to the user.

The technical scheme of the present disclosure classifies virus files detected and processes the virus files according to respective categories of the virus files. The process is implemented silently in the background and thus avoids prompting the user each time when a virus file is detected. The problem of virus alerts disturbing the user is solved and, at the same time, prompt information provided to a user is informative and user-friendly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Features of the present disclosure are illustrated by way of embodiments and are not limited to the following figures, in which like numerals indicate like elements.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Due to characteristics of the Chinese language, quantities of an element, unless specifically mentioned, may be one or a plurality of, or at least one.

Figure 1:
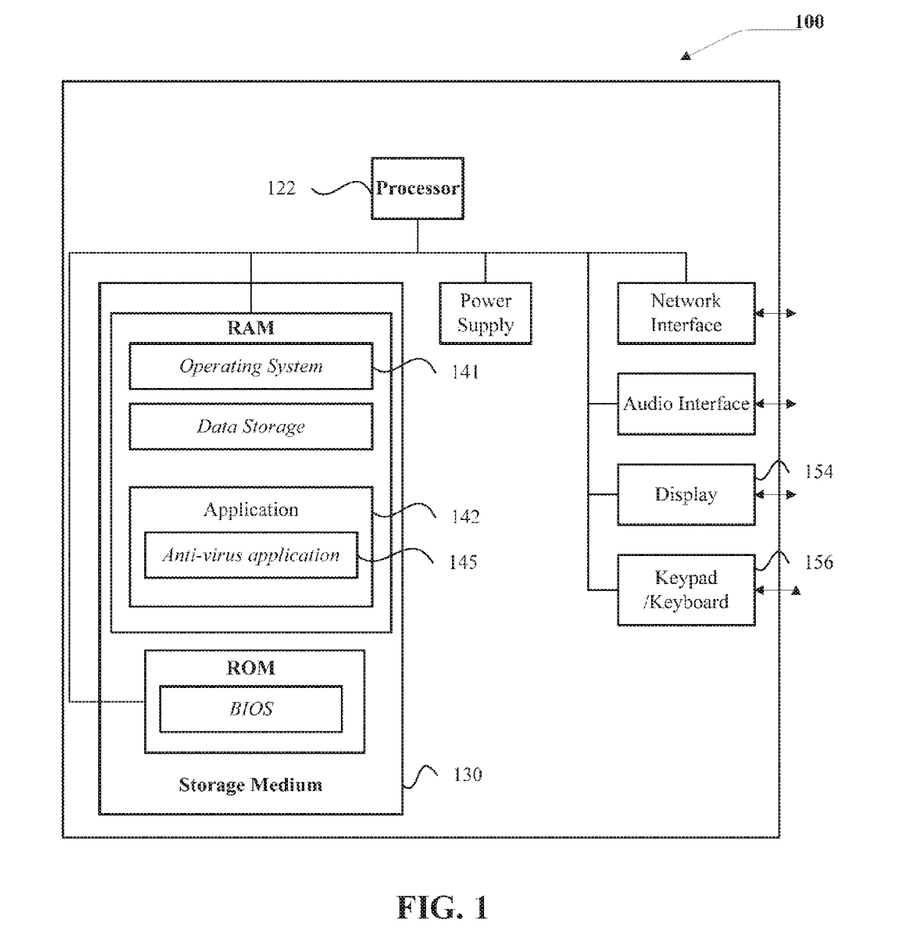
FIG. 1 is a flowchart illustrating a method for processing virus files according to various embodiments.

In various embodiments, a computer may execute methods and software systems of the present disclosure. FIG. 1 is a diagram illustrating an embodiment of a computer. As shown in FIG. 1, computer 100 may be a computing device capable of executing a method and apparatus of present disclosure. The computer 100 may, for example, be a device such as a personal desktop computer or a portable device, such as a laptop computer, a tablet computer, a cellular telephone, or a smart phone. The computer 100 may also be a server that connects to the above devices locally or via a network.

The computer 100 may vary in terms of capabilities or features. This disclosure is intended to cover a wide range of potential variations. For example, the computer 100 may include a keypad/keyboard 156. It may also comprise a display 154, such as a liquid crystal display (LCD) or a display with a high degree of functionality, such as a touch-sensitive color 2D or 3D display. In contrast, however, as another example, a web-enabled computer 100 may include one or more physical or virtual keyboards, and mass storage medium 130.

The computer 100 may also include or may execute a variety of operating systems 141, including an operating system such as a WINDOWS or LINUX or a mobile operating system, such as iOS, ANDROID, or WINDOWS MOBILE. The computer 100 may include or may execute a variety of possible applications 142, such as an anti-virus application 145. An application 142 may enable processing virus files without presenting alerts to the user of the computer 100.

Further, the computer 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions or units and/or modules that comprise the sets of instructions for conducting operations described in the present disclosure. The one or more processors may be configured to execute the sets of instructions and perform the operations in various embodiments.

Figure 2:
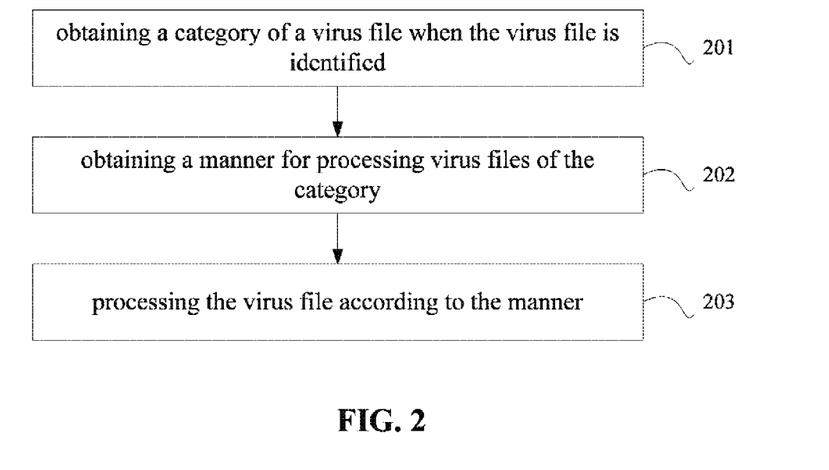
FIG. 2 is a flowchart illustrating a method for processing virus files according to various embodiments.

FIG. 2 is a flowchart illustrating a method for processing virus files according to various embodiments. In the embodiment, the method may be implemented by a user device, e.g., a fixed terminal device or a mobile terminal device. The fixed terminal device may be a PC and the like. The mobile terminal device may be a smart phone, a tablet computer, a MP3 player, a PDA and the like. As shown in FIG. 2, the method may include the following procedures.

Block 201: a category of a virus file is obtained when the virus file is identified. The user device may identify a virus file by using various methods, e.g., identifying the virus file by using an anti-virus engine installed in the user device or by using an anti-virus engine in a cloud and so on. This is not limited in the present disclosure. In various embodiments, the category of the virus file may be determined by at least one of the directories in which the virus file is located, a process accessing the virus file (i.e., an object being infected), the infection manner, and the like.

A virus file may belong to multiple categories, e.g., the virus file may belong to a category of system directories when the virus file is located in a system directory; the virus file may belong to a category of extraction of a compressed archive when the virus file is a file obtained by extracting a compressed archive. Describing a virus file by using several categories enables viewing the virus file from multiple aspects. The virus file may be processed in different manners corresponding to the different categories.

Block 202: a manner for processing virus files in the category is obtained. The method of obtaining the manner may include storing a manner for each category in the user device and/or on a server in a cloud in advance, obtaining the manner corresponding to the category when the category is identified and, when the category is identified, judging whether there is a manner associated with the category in the user device or on the server in the cloud and obtaining the manner associated with the category in response to a determination that there is a manner associated with the category in the user device or on the server in the cloud, or obtaining a manner selected by a user in response to a determination that no manner is associated with the category in the user device or on the server in the cloud. Several options may be provided for the user to choose from. When the manner for processing virus files in the category is obtained, no alert is prompted to the user and the virus file is directly processed in the background.

Block 203: the virus file is processed according to the manner. In various embodiments, the processing of a virus file may include, but is not limited to, deleting the virus, deleting the virus file completely, isolating the virus file, and the like.

In various embodiments, a method for processing virus files obtains the category of a virus file when the virus file is identified, obtains a manner for processing virus files of the category, and processes the virus file by using the manner. The technical scheme of the present disclosure classifies virus files detected and processes the virus files according to the categories of the virus files. The process is implemented at the background silently, thus avoids prompting the user each time when a virus file is detected. The mechanism avoids disturbing users with excessive virus alerts and prompts information provided to the user that is informative and user-friendly.

In various embodiments, the method of obtaining the category of the virus file when the virus file is identified in block 201 may include obtaining the category of the virus file at least by using the directory in which the virus file is located and/or a process of accessing the virus file when the virus file is identified. In various embodiments, the category of the virus file may be configured by a technician in advance or may be configured during the process of the utilization of the device by the user at least according to the directory in which the virus file is located and/or the process accessing the virus file.

During an outbreak of viruses, multiple files in one directory may become infected. When a user performs an operation on the directory, such as copy, cut, and so on, the anti-virus software may detect a large amount of viruses. By classifying files in one directory into the same category, the user may decide not to have information of all viruses found in the directory presented. Therefore, information of a virus file is not presented when the virus file is in the same directory.

When a user decompresses a compressed archive which includes a large amount of viruses, the anti-virus software may also detect a lot of virus files. Thus, files extracted by the same data compression software may be classified into the same category so that the user may decide not to have virus information detected in files extracted from one decompression process presented. As such, information of a virus file may not be displayed when the virus file is extracted in the same decompression process.

Virus files may be classified according to any classification rule to obtain a category. In various embodiments, a virus file may also be classified by using at least the above-two manners to obtain at least two categories, i.e., multi-dimensional classification, to increase the chance of the virus file having a processing manner associated with the category of the virus file and, thus, to further reduce the need of displaying prompt information for the virus file.

In various embodiments, other schemes for classifying and removing duplicated virus alerts may be designed for some typical scenarios by analyzing possible situations where a large amount of viruses may be detected by a technician or a user. When the user has explicitly expressed his/her unwillingness to receive prompt information for a certain category, the amount of alerts displayed can be reduced. In various embodiments, the method of obtaining the category of the virus file at least by using the directory in which the virus file is located and/or the process accessing the virus file may at least include any of the following procedures 1 and 2.

In procedure 1, a first category of the virus file is obtained by classifying the directory where the virus file is located by using a directory classifier when the virus file is identified. When the classifying method is configured to be classification based on the directory in which the virus file is located, a directory classifier is used to determine the category of the virus file by using the directory in which the virus file is located. The category of the virus file obtained by using a directory classifier is referred to as the first category of the virus file for simplicity.

In procedure 2, a second category of the virus file is obtained by classifying the process accessing the virus file using a process classifier when the virus file is identified. When the classifying method is configured to be classification based on the process accessing the virus file, a process classifier is used to determine the category of the virus file by using the process accessing the virus file. The category of the virus file obtained by using a process classifier is referred to as the second category of the virus file for simplicity.

The above examples classify a virus file by using the directory in which the virus file is located and/or the process accessing the virus file. Other examples may also classify the virus file by using other parameters, such as a name suffix of the virus file and the like, and are not elaborated here. The above-mentioned classifiers are merely an example. Other classifiers may be adopted in other examples to classify the virus file. In various embodiments, the classification process may classify a virus file which does not belong to any of the pre-configured categories into an unknown category and present information on the virus file of the unknown category to the user to make the user select a manner for processing the virus file of the unknown category.

In various embodiments, the method of obtaining a manner for processing virus files of the category in block 202 of FIG. 2 may include the following procedures. In procedure 1, it is determined whether there is a manner that is associated with the category of the virus file. Categories and associated processing manners may be stored in the user device in advance and are either configured by a technician or determined and saved by the user during the process of using the device. When the user decides not to have virus alert for a category of viruses, the user device may store the decision. When a virus of the same category is detected the next time, the step of presenting information of the virus may be skipped and an operation selected by the user is directly performed so as not to disturb the user.

In various embodiments, the determining in procedure 1 may be performed by using categories and associated processing manners stored on a server in the cloud, or by using categories and associated processing manners stored in the user device and categories and associated processing manners stored on the server in the cloud.

When a processing manner associated with the category of the virus category is obtained from pre-stored information, the step of presenting the information on the virus file may be skipped and the operation required by the user is directly performed so as not to disturb the user.

In procedure 2, when there is a manner associated with the category of the virus file, the manner associated with the category of the virus file is obtained. In response to a determination that there is a processing manner associated with the category of the virus file in the user device and/or on a server in the cloud, the processing manner is obtained. The classification process and the process of obtaining the category involve no virus alert presented to the user, thus virus alerts are reduced by using selections of the user stored in the user device and/or experiences stored on the server in the cloud.

In procedure 3, in response to a determination that no manner is associated with the category of the virus file, information of the virus file is presented to a user and a manner selected by the user is obtained and associated with the category of the virus file. When the user selects a manner for processing the virus file, the user device may associate the manner with the category of the virus file so that the operation selected by the user can be directly performed on a virus of the same category detected the next time and the step of presenting virus information can be skipped to avoid disturbing the user.

When the user selects to have no virus alert for the category of the virus file, the processing manner selected by the user may be stored. When receiving the decision of the user for not presenting alerts for the category of virus, the user device may store the decision, skip the step of presenting virus information the next time when a virus of the category is detected, and directly perform the operation selected by the user so as to avoid disturbing the user.

When no processing manner is associated with the category of a virus file, it means the user has not explicitly provided a manner for processing viruses of the category, thus, information on the virus file is to be presented to the user. When presenting the information, the anti-virus software may not only guide the user to process the current virus file, but may also prompt the user to decide whether to adopt the same processing manner for viruses of the same category in the future without presenting virus alerts. For example, a check box presenting "remember my choice and remind me no more" may be displayed.

In various embodiments, the step of presenting information on the virus file to the user and obtaining and associating a processing manner selected by the user with the category of the virus file in procedure 3 may include: presenting information of the virus file to the user, obtaining a processing manner selected by the user, and associating the processing manner selected by the user with the category of the virus file in response to a determination that the number of times the processing manner is selected by the user for the category of the virus file exceeds a pre-defined threshold.

In various embodiments, a decision as to whether the selected processing manner is saved may be obtained from the user. In response to a determination that the user selects to save the processing manner, the processing manner is associated with the category of the virus file. In various embodiments, the number of times a processing manner is selected by the user for the category of the virus file may be counted and the processing manner is associated with the category of the virus file in response to a determination that the number of times the processing manner is selected by the user for the category of the virus file reaches a pre-defined threshold.

In various embodiments, a method for processing virus files obtains the category of a virus file when the virus file is identified, obtains a manner for processing the category of the virus file, and processes the virus file by using the manner. The technical scheme of the present disclosure classifies virus files detected and processes the virus files according to the categories of the virus files. The process is implemented in the background silently and, thus, avoids prompting the user each time when a virus file is detected. The problem of virus alerts disturbing the user is solved and, at the same time, prompt information provided to a user is informative and user-friendly.

Any of the above examples may be combined to form a technical scheme and all the available technical scheme are not listed herein.

Figure 3:
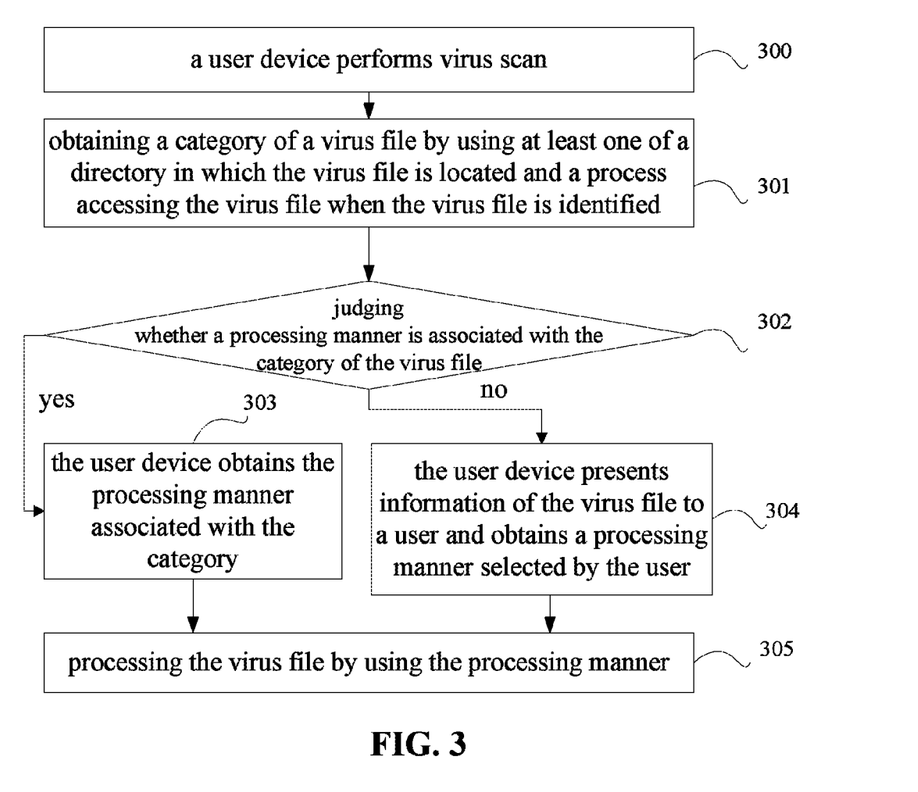
FIG. 3 is a flowchart illustrating a method for processing virus files according to various embodiments.

FIG. 3 is a flowchart illustrating a method for processing virus files according to various embodiments. FIG. 3 provides a more detailed example of the method with reference to the content as shown in FIG. 2. As shown in FIG. 3, the method may include the following procedures.

Block 300: a user device performs virus scan. The virus scan may be performed through an anti-virus application or the like, and this is not limited in the present disclosure.

Block 301: the category of a virus file is obtained by using at least one of a directory where the virus file is located and a process accessing the virus file when the virus file is identified. One or multiple categories of the virus file may be obtained.

Block 302: it is determined whether there is a manner that is associated with the category of the virus file. The procedure in block 303 is performed in response to a determination that there is a manner associated with the category of the virus file. The procedure in block 304 is performed in response to a determination that no manner is associated with the category of the virus file.

Block 303: the user device obtains a manner for processing virus files of the category and the procedure in block 305 is performed.

Block 304: the user device presents information on the virus file to the user, obtains a manner selected by the user, and the procedure in block 305 is performed. In various embodiments, the manner selected by the user is associated with the category of the virus file in response to a determination that the number of times the manner is selected by a user for the category of the virus file reaches a pre-defined threshold.

The example merely provides one method of storing a processing manner. In various embodiments, the processing manner is associated with the category of the virus file as long as the processing manner is selected by the user. When a virus of the same category is detected the next time, the step of presenting information on the virus is avoided and an operation selected by the user is directly performed so as not to disturb the user.

Block 305: the virus file is processed by using the manner.

Figure 4:
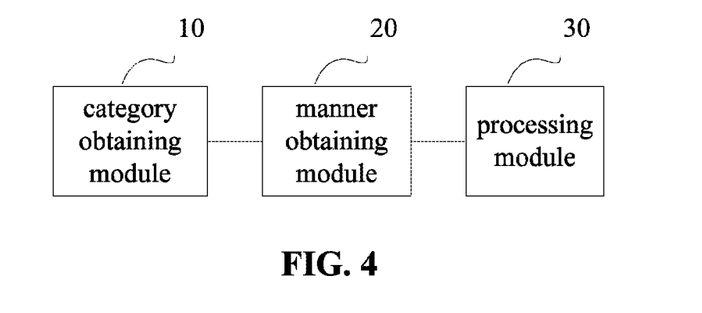
FIG. 4 is a diagram illustrating a structure of a user device according to various embodiments.

FIG. 4 is a diagram illustrating a structure of a user device according to various embodiments. As shown in FIG. 4, the user device may include the following components. A category obtaining module 10 is configured to obtain a category of a virus file when the virus file is identified. A manner obtaining module 20 is configured to obtain a manner for processing virus files of the category. A processing module 30 is configured to process the virus file according to the manner.

In various embodiments, the category obtaining module 10 may obtain the category of the virus file by using at least one of a directory where the virus file is located and a process accessing the virus file when the virus file is identified. In various embodiments, the category obtaining module 10 may obtain a first category of the virus file by classifying the directory in which the virus file is located by using a directory classifier and/or obtain a second category of the virus file by classifying the process visiting the virus file by using a process classifier.

In various embodiments, the manner obtaining module 20 may include:

a judging unit, configured to judge whether there is a manner that is associated with the category of the virus file;

an obtaining unit, configured to obtain the manner associated with the category of the virus file in response to a determination that there is a manner associated with the category of the virus file and to present information of the virus file to a user in response to a determination that no manner is associated with the category of the virus file, obtain a manner selected by the user, and associate the manner selected by the user with the category of the virus file.

In various embodiments, the obtaining unit may present the information of the virus file to the user, obtain a manner selected by the user, and associate the manner with the category of the virus file in response to a determination that the number of times the manner is selected by the user exceeds a pre-defined threshold.

The user device including the above components as shown in FIG. 3 is merely an example. In various embodiments, a user device may include any combination of features in the above examples as long as the combined scheme is feasible.

The user device implements obtaining a category of a virus file and a processing manner for processing the category of the virus file by using the above modules in the same manner of the above method embodiment. Details of the implementation can be found in the above description in connection with the above method and will not be described further herein.

It should be understood that in the above processes and structures, not all of the procedures and modules are necessary. Certain procedures or modules may be omitted according to the needs. The order of the procedures is not fixed and can be adjusted according to the needs. The modules are defined based on function simply for facilitating description. In implementation, a module may be implemented by multiple modules and functions of multiple modules may be implemented by the same module. The modules may reside in the same device or may be distributed in different devices. The "first", "second" in the above descriptions are merely for distinguishing two similar objects and have no substantial meanings.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions to cause a machine to execute a method as described herein. Specifically, a system or apparatus having a storage medium which stores machine-readable program codes for implementing functions of any of the above examples and which may make the system or the apparatus (or CPU or MPU) read and execute the program codes stored in the storage medium. In addition, instructions of the program codes may cause an operating system running in a computer to implement part or all of the operations. In addition, the program codes implemented from a storage medium are written in a storage device in an extension board inserted in the computer or in a storage device in an extension unit connected to the computer. In this example, a CPU in the extension board or the extension unit executes at least part of the operations according to the instructions based on the program codes to realize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

The scope of the claims should not be limited by the embodiments set forth in the examples, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for processing virus files, comprising: providing first information about a plurality of categories which are classified by directories where files are located or classified by a process that accesses the files; providing second information about a processing procedure corresponding to each of the categories; obtaining when a virus file is identified at least one of a directory where the virus file is located or the process that accesses the virus file; obtaining from the first information a category determined in accordance with at least one of the directory or the process, and assigning the category to the virus file, wherein obtaining from the first information includes at least one of using a directory classifier to classify the directory to obtain the category or using a process classifier to obtain the category; obtaining from the second information the processing procedure determined in accordance with the category; determining whether the processing procedure is associated with the category, and in response to a determination that the processing procedure is not associated with the category, presenting information about the virus file to a user, obtaining a processing procedure selected by the user, and associating the processing procedure selected by the user with the second information,
wherein associating the processing procedure selected by the user with the second information includes storing in the second information that the processing procedure selected by the user is associated with the category of the virus file in response to determining that a number of times the processing procedure is selected by the user exceeds a pre-defined threshold; and
processing the virus file in accordance with the processing procedure without presenting a virus alert about the virus file to the user.

2. The method of claim 1, wherein obtaining from the second information and processing the virus comprises performing the obtaining and the processing using a background process.

3. The method of claim 1, wherein processing the virus file comprises prohibiting the virus alert about the virus file to be presented to the user.

4. The method of claim 1, wherein the first information includes at least one of:
a category associated with a system directory of an operating system;
a category associated with a compressed archive; or
a category associated with a extracting process.

5. A user device for processing virus files, comprising: a storage module configured to provide first information about a plurality of categories which are classified by a directory where files are located or by a process that accesses the files, and to provide second information about a processing procedure corresponding to each of the categories; a category obtaining module configured to obtain, when a virus file is identified, at least one of the directory where the virus file is located or the process that accesses the virus file to obtain from the first information the category therefrom, and assign the category to the virus file; wherein the category obtaining module is configured to at least one of classify the directory in which the virus file is located using a directory classifier to obtain the category or classify the process accessing the virus file using a process classifier to obtain the category; and a manner obtaining module configured to obtain from the second information a processing procedure determined in accordance with the category assigned to the virus file, wherein the manner obtaining module includes:
a judging unit configured to determine whether the second information includes the processing procedure; and
an obtaining unit configured to obtain the processing procedure in response to a determination that the second information includes no processing procedure, present information about the virus file to a user in response to a determination that no procedure is associated with the category of the virus file, obtain a user processing procedure selected by the user, and associate the user processing procedure with the category of the virus file in the second information,
wherein the obtaining unit is further configured to present the information about the virus file to the user, obtain the user processing procedure selected by the user, associate the user processing procedure with the category of the virus file in the second information in response to a determination that a number of times the processing procedure is selected by the user exceeds a pre-defined threshold; and
a processing module configured to process the virus file in accordance with the processing procedure without presenting a virus alert about the virus file to the user.

6. The user device of claim 5, wherein at least one of the manner obtaining module and the processing module is implemented by using a background process.

7. The user device of claim 5, wherein at least one of the manner obtaining module and the processing module is configured to prohibit the virus alert about the virus file to be presented to the user.

8. A non-transitory computer-readable storage medium comprising a set of instructions for processing virus files, the set of instructions to direct at least one processor to perform acts of: providing first information about a plurality of categories which are classified by directories where files are located or classified by processes that accesses the files; providing second information about a processing procedure corresponding to each of the categories; obtaining, when a virus file is identified, at least one of the directory where the virus file is located or the process that accesses the virus file; obtaining, from the first information, a category determined in accordance with at least one of the directory where the virus file is located or the process that accesses the virus file, and assigning the category to the virus file, wherein obtaining the category includes at least one of obtaining a first category of the virus file by classifying the directory where the virus file is located using a directory classifier or obtaining a second category of the virus file by classifying the processing procedure that accesses the virus file by using a process classifier; and; determining whether the second information indicates a processing procedure associated with the category assigned to the virus file, wherein associating the category with the processing procedure includes associating the processing procedure selected by a user with the category in the second information in response to a determination that a number of times the processing procedure is selected by user for the category has exceeded a pre-defined threshold;

if no processing procedure is associated with the category assigned to the virus file, presenting information about the virus file to the user, obtaining a processing procedure selected by the user for the category assigned to the virus file, associating in the second information the category with the processing procedure selected by the user, and processing the virus file using the processing procedure; and     if the second information indicates a processing procedure associated with the category assigned to the virus file, processing the virus file using the processing procedure determined in accordance with the category assigned to the virus file without presenting a virus alert about the virus file to the user.

9. The non-transitory computer-readable storage medium of claim 8, wherein associating the category with the processing procedure selected by the user in the second information comprises associating the processing procedure selected by the user in the second information in response to an instruction from the user that the user decides not to have a virus alert for the category.

* * * * *